(12) United States Patent
Wetzel et al.

(10) Patent No.: US 8,914,046 B2
(45) Date of Patent: *Dec. 16, 2014

(54) METHOD AND APPARATUS FOR CONTROLLING SITE-SPECIFIC OPERATIONS

(75) Inventors: Robert Alan Wetzel, Melbourne, FL (US); Patrick Joseph Venneman, Blue Springs, MO (US)

(73) Assignee: General Electric Company, Schenectady, NY (US)

( * ) Notice: Subject to any disclaimer, the term of this patent is extended or adjusted under 35 U.S.C. 154(b) by 182 days.

This patent is subject to a terminal disclaimer.

(21) Appl. No.: 13/530,420

(22) Filed: Jun. 22, 2012

(65) Prior Publication Data
US 2012/0258739 A1 Oct. 11, 2012

Related U.S. Application Data

(63) Continuation of application No. 12/234,055, filed on Sep. 19, 2008, now Pat. No. 8,244,276, which is a continuation of application No. 11/136,770, filed on May 25, 2005, now Pat. No. 7,428,419, which is a continuation-in-part of application No. 10/901,746, filed on Jul. 28, 2004, now Pat. No. 7,832,638.

(60) Provisional application No. 60/490,861, filed on Jul. 29, 2003.

(51) Int. Cl.
*H04W 24/00* (2009.01)
*G07C 1/20* (2006.01)
*G07C 3/14* (2006.01)
*H04W 64/00* (2009.01)

(52) U.S. Cl.
CPC ............... *G07C 1/20* (2013.01); *H04W 64/00* (2013.01); *G07C 3/14* (2013.01)
USPC .............. 455/456.5; 455/456.6; 455/456.1; 702/182

(58) Field of Classification Search
CPC .. H04W 64/00; H04W 4/02; H04L 29/08657; G06F 11/3409
USPC ............. 455/456.5, 456.6, 456.1; 702/182
See application file for complete search history.

(56) References Cited

U.S. PATENT DOCUMENTS

| | | | |
|---|---|---|---|
| 6,947,976 B1 * | 9/2005 | Devitt et al. | 709/219 |
| 7,776,505 B2 * | 8/2010 | Gonsalves | 430/270.1 |
| 2003/0013458 A1 * | 1/2003 | Yabe et al. | 455/456 |
| 2003/0061005 A1 * | 3/2003 | Manegold et al. | 702/182 |

* cited by examiner

*Primary Examiner* — Danh Le
(74) *Attorney, Agent, or Firm* — GE Global Patent Operation; John A. Kramer

(57) ABSTRACT

A method and apparatus for controlling a site-specific activity at a plurality of remote locations, for example, the inspection of geographically remote equipment or the gathering of data for a census. A mobile operator transports a portable tool to a plurality of locations where a site-specific activity is to be conducted. The portable tool includes a location detection device. Processing of data using the portable tool is enabled only when the portable tool is located proximate a designated site, as determined by the location detection device. In various embodiments, the enabled site-specific activity may include data recordation, data transmission, data reception, data processing, and/or the display of a data entry form.

18 Claims, 3 Drawing Sheets

FIG. 3

```
                                          ⊏×9:35 ⊗
file: /^Storage%20Card\My%20Doc Length of Switch Point
    ○ 166    ⊙ 196    ○ 26     ○ 30

○ 39     ○ other :

Rollers Operatable

Yes ⊙    No ○

Switch Properly Anchored
    (Standard Anchor Pattern for
    Turnout Approaches)

Yes ⊙    No ○

Yes ○    No ⊙

Switch In Proper Alignment
```

METHOD AND APPARATUS FOR CONTROLLING SITE-SPECIFIC OPERATIONS

This application is a continuation of U.S. patent application Ser. No. 12/234,055, filed on 19 Sep. 2008 now U.S. Pat. No. 8,244,276, which is a continuation of U.S. patent application Ser. No. 11/136,770, filed on 25 May 2005 (now U.S. Pat. No. 7,428,419), which is a continuation-in-part of U.S. patent application Ser. No. 10/901,746, filed on 28 Jul. 2004 (now U.S. Pat. No. 7,832,638), which claims priority to U.S. Provisional Application No. 60/490,861, filed 29 Jul. 2003, all of which are incorporated by reference herein.

TECHNICAL FIELD

The presently described inventive subject matter relates generally to controlling site-specific activities related to remotely located assets.

BACKGROUND

There are many applications requiring the processing of data regarding geographically dispersed assets. For example, railroad system assets must be inspected periodically, and the resulting inspection data must be reported in accordance with Federal Railroad Administration (FRA) guidelines. Inspectors travel to the various track, wayside, grade crossing and signaling component locations to perform inspections and to record the resulting inspection data. In another example, census takers must travel to a plurality of residences to gather data related to persons living at the respective locations. Traditionally, inspection forms used to record such data had been hard copy paper forms. Systems currently being developed are able to record data in electronic format using a portable electronic tool. These systems improve the accuracy of the data recordation process by permitting data entry via pull-down menus, button selection for simple yes/no answers, automatic data range checking, etc. However, there is still an opportunity for erroneous data entry resulting from mistaken asset identification, and there is the possibility of fictitious data entry by an unscrupulous operator.

European Patent Application EP 1 081 659 A1 describes a method for inspecting objects located at spread locations wherein each of the objects is provided with a transponder. An interrogation device transported by an inspector activates a transponder when the interrogation device is located a short distance from the transponder. In this manner, some assurance is provided that the inspector has actually traveled to the location of the object to perform an inspection.

BRIEF DESCRIPTION OF THE DRAWINGS

FIG. 3 illustrates an example data input display of a portable inspection data recording device.

DETAILED DESCRIPTION

Figure 1:
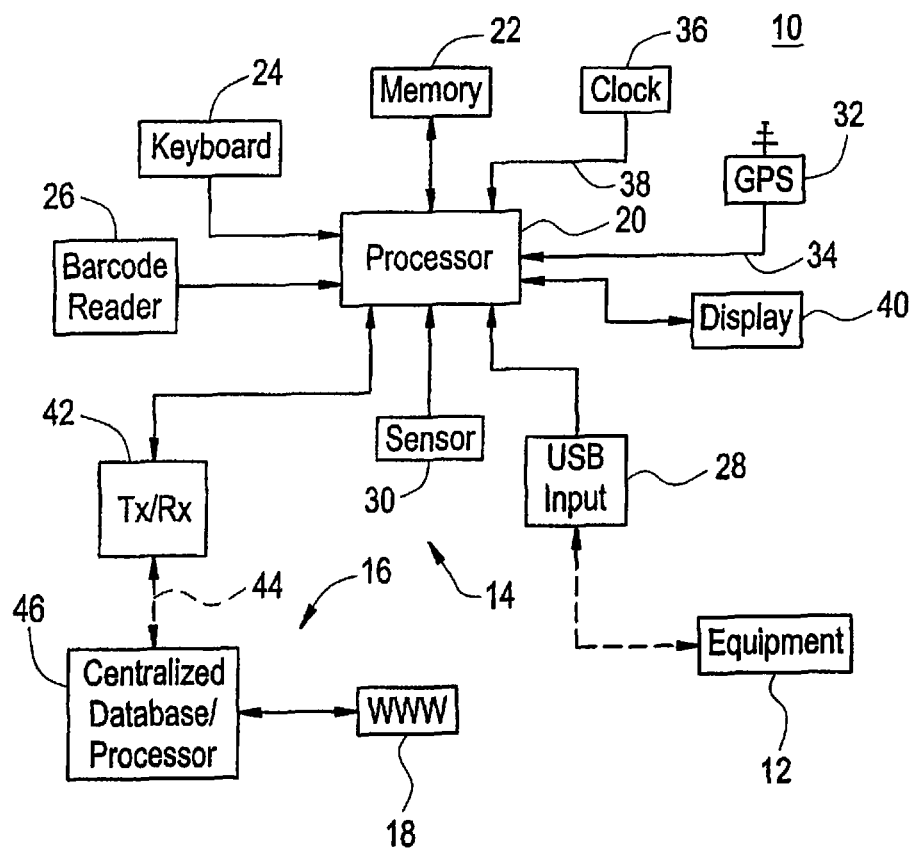
FIG. 1 is a schematic illustration of an equipment inspection data recording system.

FIG. 1 illustrates a data processing system 10 that may be utilized when conducting inspections of railroad system assets as required by the Federal Railroad Administration, or when performing other site-specific operations related to assets that are distributed among a plurality of remote sites to which a mobile operator must travel to perform the site-specific operation. The term asset is used herein in a broad sense to include equipment, structures, locations, persons, etc. The terms inspection and inspecting are used herein in a broad sense to include actions related to physical inspection by visual, mechanical, electrical, chemical or other means; testing; maintenance; calibration; replacement; repair; or other such activities as may be necessary for remotely distributed assets. The term site-specific operation is used herein in a broad sense to include any activity that is required to be performed at a particular site. Such activities may include, but are not limited to: inspecting; maintaining; repairing; controlling; interviewing; data processing or data handling, including data entry, data recordation, data sorting, data accessing, data recall, data transmittal, data reception, data manipulation, data correlation or association, display of data or information derived from data, etc.; as well as other activities performed or enabled by a person and/or a machine.

For an embodiment of the inventive subject matter utilized with railroad systems, the asset 12 may include any track, wayside, structure or equipment associated with the railroad activities, such as signaling equipment, grade crossing equipment, rolling stock, bridges, rail, tunnels, etc. Equipment 12 located at a particular wayside location may include a plurality of individual units of equipment associated with an equipment bungalow wherein power, control, and/or communication functions are cooperatively linked.

Assets at each location may be associated with a unique asset identifier so that no two locations have the same identifier. The following discussion will describe an embodiment utilized with railroad equipment for which the unique asset identifier may be referred to as a unique equipment identifier. For grade crossing warning equipment in the United States, the unique equipment identifier may be the number assigned by the United States Department of Transportation (DOT). Alternatively, the unique equipment identifier may be the railroad's milepost number, a bungalow number, or a derivative thereof. The unique equipment identifier may be any character set that uniquely identifies a particular location where equipment to be inspected is situated. Individual units of equipment located at a single location may be further associated with the respective unique equipment identifier, such as with a sub-numbering system.

Equipment inspection data processing system 10 includes a portable recording device such as inspection data recording device 14 that is transported by the mobile inspector to the various equipment sites. The system 10 may also include a centralized data management portion 16 for the collection of inspection data from a plurality of similar portable inspection data recording devices 14 and for the analysis of the inspection data. The data management portion 16 may be used for the distribution of the analysis results and related information, for example via a connection to a global information system such as the World Wide Web 18.

The portable inspection data recording device 14 may be built upon any available portable electronic tool, variously configured and described as a personal information manager (RIM), pocket personal computer (PC), personal data assistant (PDA), personal mobile tool (PMT), etc. The portable inspection data recording device 14 includes a processor 20 having various input and output connections, as described more fully below.

A memory 22 is accessible by the processor 20. The memory may be a local portable memory that is transported as part of the portable inspection data recording device 14 and/or a remote memory accessible to the processor 20 via a communications link (not shown). Among other data, the memory 22 may contain a database associating a plurality of unique equipment identifiers with a respective plurality of physical locations for a universe of equipment 12 to be inspected by the mobile inspector utilizing the portable inspection data recording device 14. This association may be accomplished via one or more look-up tables, for example.

An operator-actuated input device such as keyboard 24 may be used to allow the inspector to input data to the processor 20 and memory 22. In addition to a keyboard, other forms of operator-actuated input devices may be used, including but not limited to a joy-stick, roller ball, voice-activated control, etc.

The portable inspection data recording device 14 may also include various input devices designed to receive data directly or indirectly from the equipment 12. Examples of such devices include a barcode reader 26, a USB connection 28, and a sensor 30 such as a voltage meter, current meter, ohmmeter, timer, RF tag reader, etc.

The location of the portable inspection data recording device 14 is determined by a location detector 32 such as a global positioning system (GPS) receiver transported with the portable inspection data recording device 14. The location detector 32 provides a location signal 34 responsive to the current location of the portable inspection data recording device 14. Temporal information may also be provided via a GPS receiver, or alternatively, a separate clock 36 may provide a time signal 38 to processor 20. One or more other types of position detection technology may be used to determine a current position of the data recording device 14. For example, cellular telephones will soon be equipped with triangulation capability that will permit location determining capability and communication capability to be integrated into a single device. Furthermore, the location detector utilized in certain embodiments of the present inventive subject matter may include processing capability located remote from the portable computing device itself, such as a centrally located monitoring system capable of detecting and locating the device 14 in space and/or in relation to a designated site and then transmitting such position information to the portable device 14.

A display 40 may function as an output device for displaying a graphical display to the inspector, and/or it may be used as an input device, such as when embodied as a touch-screen display or when used in conjunction with the operator-actuated input device in a point-and-click mode. Data may be communicated through a transceiver 42 via a communication channel 44 to and/or from a centralized database 46 that forms put of the centralized data management portion 16. The communication channel 44 may include wireless cellular or wired telephone communications, satellite communications, Internet connections including a Wi-Fi wireless connection, and the like. Alternatively, the communication channel 44 may be provided by transporting the portable data recording device back to a computer for communicating the data via a wired or wireless connection to the computer. Centralized database 46 may be populated with current inspection data for equipment 12 at periodic intervals determined by the inspector by selectively establishing communication link 44 via a suitable transmitter such as transceiver 42. Data contained in centralized database 46 may be manipulated to produce various types of reports, such as reports in compliance with Federal Railroad Administration requirements. One may appreciate that various memories and databases associated with system 10 may be resident on the portable inspection data recording device 14 or may be located off-board the portable inspection data recording device 14 and accessible via the communications channel 44.

Equipment inspection data processing system 10 enables inspection data recording processes that provide improved data integrity when compared to processes achievable with prior art systems, as described more fully below.

The location of equipment 12 to be inspected may be mapped and an identifier may be assigned that is unique to the location of the equipment. For example, the latitude and longitude (or other unique equipment identifier) of a railroad crossing may be measured and recorded in a database such as memory 22 and/or central database 46 and then associated with the equipment located at that crossing. Details regarding the equipment may further be associated with the unique equipment identifier, such as the model number of hardware and/or the revision number of software at each mapped location. The location and equipment information may be displayed in a variety of formats, such as by being superimposed on a map on an Internet web page with hyperlinks provided at points on the map where equipment is located. The hyperlinks may provide additional details regarding the equipment at the particular location of the hyperlink.

One may appreciate that the systems and methods described herein do not require the existence of any special equipment at the asset location, such as a site-specific transponder as is known in prior art systems and methods. Thus, the presently described inventive subject matter avoids the cost and time associated with the installation and maintenance of such special equipment. Furthermore, the systems and methods described herein do not necessarily require any special physical marking of the asset, such as bar coding, although such physical marking may be used advantageously in certain embodiments as described herein.

The inventory mapping process may be accomplished over a period of time as inspectors visit the various equipment sites for routine inspections. When the inspector arrives at a particular site, the GPS receiver 32 portion of portable inspection data recording device 14 is used to identify the geographic location of the site. An inventor of the equipment at that site may then be accomplished, with the respective equipment inventory being associated with the geographic location in memory 22 and/or in central database 46 via data through communication link 44. The memory/database may be updated over time to reflect service performed to the equipment or any change, addition or modification to the equipment. The database/memory may be accessed by software configured to allow searching in a variety of modes, such as by equipment type, by location, by time since last service date, etc. Data may be presented in any format, including as a web page, wherein hyperlinks are provided to additional levels of detail regarding the equipment.

Memory 22 and/or database 46 may also contain an association between the unique equipment identifier for respective locations and individual ones of a plurality of data recordation forms appropriate for the specific equipment 12 at the respective location. In one embodiment, the forms may be configured to comply with FRA reporting requirements.

To begin an inspection activity, the route of a mobile inspector may be planned by using the equipment location information complied in the inventory-mapping step described above. Memory 22 is programmed with current information relating the unique equipment identifier verses location information, and with current information relating appropriate data recordation forms verses unique equipment identifier, as described above. The inspector then transports the portable inspection data recording device 14 to the location of equipment 12 selected for inspection. The identification of the inspector may be made known to the processor 22 by incorporating logic requiring a password, a secure digital identification card, etc., and operation of the device 14 may be limited to one or more predetermined inspectors. Logic executable by the processor 20 may be programmed into the portable inspection data recording device 14 to provide travel directions to the inspector via display 40 in order to assist the inspector in arriving at the selected equipment location. Such logic may be responsive to the unique equipment identifier for the selected equipment 12 inputted by the inspector, such as via keyboard 24, and to the position signal 34. The selected destination location associated with the inputted unique equipment identifier in memory 22 is compared to the actual location of the device 14 as indicated by location signal 34 to determine appropriate travel directions for display.

Upon arrival at the selected equipment site, the inspector confirms his/her plans for inspection by inputting the unique equipment identifier for the selected equipment. This step may have already been accomplished in order to obtain the travel directions described above, or it may be accomplished upon arrival at the selected site. If the inspector's route was planned geographically without prior knowledge of the unique equipment identifier associated with a particular location, the inspector may execute logic via processor 20 to index memory 22 with the actual location as indicated by location signal 34 to determine the corresponding unique equipment identifier for that location. Alternatively, the inspector may input the selected unique equipment identifier by using keyboard 24, or by scanning a bar code located on the equipment using barcode reader 26, for example.

The portable inspection data recording device 14 may be programmed to allow the recordation and/or transmittal of inspection data only when the device 14 is actually at the location of equipment selected to be inspected. This ensures that the inspector has arrived at the correct location for performing the intended inspection, and it provides an additional level of protection against erroneous data recordation. This also precludes the recordation of fictitious data by a person located away from the actual equipment location. To provide further assurance of data integrity and to provide information useful for work efficiency evaluations, the system may automatically record temporal information related to the arrival and dwell of the data recording device 14 at the particular equipment location and/or at other locations to track the movement of the portable device 14. Both the location and temporal information may be derived from the global positioning system 32.

Figure 2:
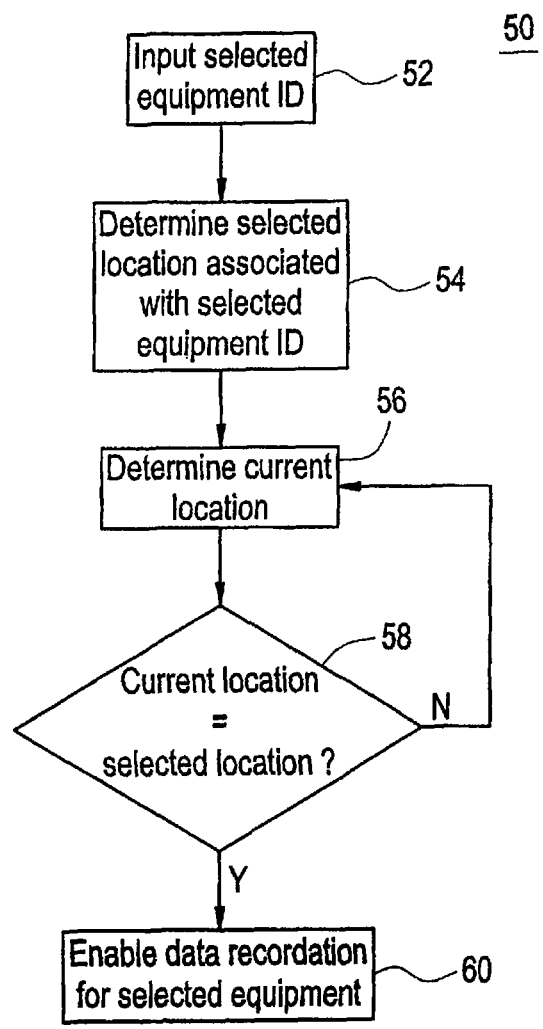
FIG. 2 illustrates steps in a process for enabling data recordation only when a portable data recording device is at a selected equipment location.

In one embodiment, data recording device 14 is provided with logic executable by the processor for indexing memory 22 with the unique equipment identifier that has been inputted by the inspector to identify the associated location of the equipment selected for inspection. FIG. 2 illustrates steps in a process 50 for enabling data recordation only when a portable data recording device is at a selected equipment location. The unique equipment identifier for equipment selected for inspection is inputted at step 52, such as by the inspector typing the identifier into keyboard 24, or scanning a barcode with barcode reader 26 or by pre-programming device 14 with a schedule of planned inspections. The location of the selected equipment is then determined, such as by indexing associated locations saved in memory 22. The current location of the portable data recording device 14 is then determined at step 56 such as with location signal 34. That equipment location is then compared to the actual location of the data recording device 14 at step 58. If the actual location of device 14 does not correspond to the location of the selected equipment, the recordation of inspection data for the selected equipment is precluded and step 56 may be repeated. An error message or travel direction information may be provided to the inspector at this point. If, however, the actual location of device 14 does correspond to the location of the selected equipment, the recordation of inspection data for the selected equipment is enabled at step 60. One may appreciate that other logic schemes may be used accomplish the result of enabling the recordation of data only when the inspector is physically located at the location of the equipment to be inspected.

The closeness of the match between the location of the inspection data recording device 14 and the location of the selected equipment 12 that is necessary to trigger the enablement of the recordation of inspection data may be programmed to any desired tolerance. This relationship may be variously described herein as proximate locations or locations that correspond, or being at a location, etc. While some location tracking systems may have the ability to identify location to within a few meters or less, it may be practical in an embodiment of the presently described inventive subject matter to consider the data recording device 14 to be sufficiently close to the selected equipment location to enable data recording if the two location coordinates are within ten meters of each other or other site-appropriate value. For example, this tolerance may be selected to permit the inspector to record data or to transmit data to the off-board database 46 while sitting in a vehicle parked near the equipment 12. The site-appropriate value may be selected and fixed in advance, or it may be adjusted to accommodate a special situation upon communication from the operator to a centralized control location. This capability may be useful, for example, when the asset being inspected is located in a natural setting, such as a playing apparatus in a park setting, and when an abnormal situation, such as flooding due to unusual rain accumulation, prohibits a normally close approach to the asset. The operator may communicate with a centralized control location, such as centralized processor 46, to explain the situation, whereupon the proximity match necessary to enable the site-specific operation may be at least temporarily reprogrammed via remote communication via link 42.

In certain embodiments, such as when inspecting outdoor equipment, for example some locations of traffic signals or telecommunication sites, the match between the designated site and the actual location of the portable electronic tool 10 may need to be measured in only two dimensions, such as latitude and longitude. In other embodiments, such as when the designated site is within a building, for example utility meters in an apartment complex or patients in a health care facility or inventory in a warehouse, the location may need to be measured in three dimensions, such as latitude, longitude and altitude. Modern GPS and other positioning detection systems provide such capability. The proximity between the portable tool and the designated site necessary for enabling the portable tool to be commanded by the operator to perform the site-specific operation may be specified as a desired value in each of the dimensions, with the required proximity value not necessarily being the same in each or any two of the dimensions. In one embodiment, a first site-specific activity may be controlled by defining generally broad proximity limits in only the horizontal dimensions, such as an activity associated with a building. A second group of site-specific activities within that building may then be controlled with generally more narrow proximity limits, with vertical limits set to recognize the floor of the building and horizontal limits set to differentiate locations of the site-specific activities on the floors.

The system 10 may enable the recordation of inspection data for the selected equipment 12 by providing an appropriate equipment-specific inspection recordation form(s) to the inspector via display 40 only when the current location indicates that the portable inspection data recording device 14 is proximate the location correlated in memory 22 with the inputted unique equipment identifier. A plurality of equipment-specific data recordation forms may be stored in memory 22, and logic executable by the processor 20 may be responsive to the selected unique equipment identifier inputted by the inspector to present the appropriate form. The format of the inspection data recordation forms may be designed to simplify the effort for the inspector. Data may be input to the data recording device 14 manually via keyboard 24, via a connected bar code reader 26, and/or via connection to other types of equipment at the location or brought to the location by the inspector such as through USB port 28, and via automatic data population responsive to the position signal 34 and/or to the selected unique equipment identifier. Data that may be automatically populated may include, among others, the location; the unique equipment identifier; the identity of the inspector; time data including, for example, time of change of position of the recording device such as may be useful for tracking the movement and activities of the inspector; and data related to the selected asset such as serial numbers, performance information, planned inspection points, warnings and instructions to the inspector, among others. Pull down menus and automatic comparison to permitted data values may be used to improve data integrity. FIG. 3 illustrates an example data input display on the touch screen of a portable digital tool. Temporal information may be automatically recorded. The system 10 may further permit the transmission of inspection data for selected equipment from the portable inspection data recording derive 14 to the centralized database 46 only when the position detection device 32 indicates that the recording device 14 is located at the location of the selected equipment.

The data processing system 10 may be utilized for other site-specific operations. In one embodiment, system 10 is used in conjunction with a census taking operation for the gathering of data regarding persons who are associated with a designated location. Census takers are provided with a list of residence addresses from which no written reply has been received in response to a mailed request for information. The census taker is directed to visit each residence and to conduct an interview with person(s) residing at that location. It is known that the integrity of such census activity is degraded as a result of erroneous data entry and as a result of dishonesty by census takers who complete a data form for an address without ever visiting that residence. The incidence of dishonest data input is expected to be reduced by enabling a portable electronic tool such as portable data recording device 14 to be commanded by a census taker to perform a desired data handling operation associated with the census only when the position detection device 32 associated with the tool indicates that the tool is located proximate a designated address. Such site-specific control may be exerted at any one or more steps in the on-site process, such as during a data entry step, a data processing step, a data transmittal step, or a data receipt step. Furthermore, the incidence of erroneous data input is expected to be reduced by displaying an appropriate data recordation form via the portable tool for the entry of the census data related to person(s) at the designated location only when the position detection device 32 detects that the tool is located proximate the designated address. The tool may also be used to improve productivity of the census taker by displaying on a display of the tool a map including the designated location and a current geographic location of the tool as determined by the position detection device 32, or by otherwise providing directions to the census taker via the tool. Productivity of a census taker may be conveniently tracked by processing time data together with the recorded data regarding the person residing at the address.

In the above discussion, it may be appreciated that a processor, such as processor 20 or a server of a base network, executing instructions cola program code product stored in a computer readable medium such as memory 22, may perform the method steps discussed. It is understood that the various systems described herein may be realized in hardware, software, firmware or a combination thereof, and may be compartmentalized other than as shown. In one embodiment, a tool as described in United States Patent Application Publication US 2003/0061159 A1, incorporated in its entirety by reference herein, may be programmed with appropriate software code modules for carrying out the methods described herein. The presently described inventive subject matter may be embedded in program instructions which comprise features enabling the implementation of the methods and functions described herein, and wherein when executed on a processor, the technical effect is to carry carrying out such methods and functions to control a site-specific operation. The program code may be stored on a computer usable/readable medium for access by a computerized storage and retrieval system. Computer program, software program, software code module, program, program product and software in the present context mean any expression in any language, code or notation, of a set of instructions intended to cause a system having an information processing capability to perform a particular function, either directly or after conversion to another language, code or notation, and/or after reproduction in a different material form. Various computer, processing functions may be provided locally or via a network, such as for example the Internet.

While the preferred embodiments of the presently described inventive subject matter have been shown and described herein, it will be obvious that such embodiments are provided by way of example only. Numerous variations, changes and substitutions will occur to those of ordinary skill in the art without departing from the inventive subject matter described herein.

The invention claimed is:

1. A method comprising:
   determining a position of a portable electronic tool relative to a designated site;
   processing site-specific data in response to the position of the portable electronic tool being proximate to the designated site; and
   displaying designated site-specific information, inspection data, and equipment related information on the portable electronic tool.

2. The method of claim 1, further comprising recording inspection data in an inspection data recordation form displayed by the portable electronic tool.

3. The method of claim 1, further comprising enabling a population of inspection data into an inspection data recordation form only when the location of the portable electronic tool is proximate to the designated site.

4. A controller comprising:
   a first software code module configured to determine a position of a computing device relative to a designated site;
   a second software code module configured to process site-specific data in response to the position of the device being proximate to the designated site; and a third software code module configured to designate site-specific information, inspection data, and equipment related information on the portable electronic tool.

5. The controller of claim 4, further comprising a fourth software code module for enabling selection and display of a data recordation form from a plurality of differing data recordation forms based on one or more of the designated site, the position of the device relative to the designated site, equipment to be inspected at the designated site, or an inspection to be performed on equipment at the designated site.

6. The controller of claim 4, further comprising a fourth software code module that stores information about at least one of the site-specific data or processed site-specific data in a memory.

7. The controller of claim 4, further comprising a fourth software code module for enabling transmission of the site-specific data to a remote location.

8. The controller of claim 4, further comprising a fourth software code module for enabling receipt of data from a remote location.

9. The controller of claim 4, further comprising a fourth software code module for enabling display of designated site information in response to the position of the device being proximate to the designated site.

10. The controller of claim 4, wherein at least one of the first or second software code modules comprises required proximity values that are not the same as each other in at least two of three dimensions, and wherein the device is proximate to the designated site when a distance between the device and the designated site is within the required proximity values.

11. A system comprising:
a controller operable to:
process site-specific data if a location of a portable electronic tool is proximate to a designated site;
process the site-specific data in response to the location of the device being proximate to the designated site; and
display at least two of designated site-specific information, inspection data, and equipment related information on the portable electronic tool.

12. The system of claim 11, wherein the portable electronic tool is proximate to the designated site when the portable electronic tool is within a predetermined distance from the designated site and the portable electronic tool is remote from the designated site when the portable electronic tool is outside of the predetermined distance from the designated site.

13. The system of claim 12, wherein the site-specific data is acquired from a site-specific operation performed at the designated site that comprises one or more of testing, maintenance, calibration, replacement, or repair of equipment located proximate to the designated site.

14. A portable electronic tool comprising:
a location detection device;
a data entry device comprising a display, a memory, and a processor;
wherein the processor operatively connects the location detection device and the data entry device; and
program code executable by the processor to enable entry of site-specific data into the memory when the location detection device determines that the portable electronic tool is within a predetermined distance of a designated site, and show at least two of designated site-specific information, inspection data, and equipment related information on the display.

15. The portable electronic tool of claim 14, further comprising:
a transmitter; and
program code executable by the processor to enable transmission of data by the transmitter only when the location detection device determines that the portable electronic tool is within the predetermined distance of the designated site.

16. The portable electronic tool of claim 14, further comprising:
a receiver; and
program code executable by the processor to enable the receipt of data by the receiver only when the location detection device determines that the portable electronic tool is within the predetermined distance of the designated site.

17. The portable electronic tool of claim 14, further comprising program code executable by the processor to enable the entry into the memory of site-specific data associated with a designated asset associated with a designated asset identifier only when the location detection device determines that the portable electronic tool is within a predetermined distance of the designated site that is associated in the memory with the designated asset.

18. The portable electronic tool of claim 14, wherein the data entry device is further operable to record temporal information related to a dwell time of the portable electronic tool at the designated site.

* * * * *